Figure 1:
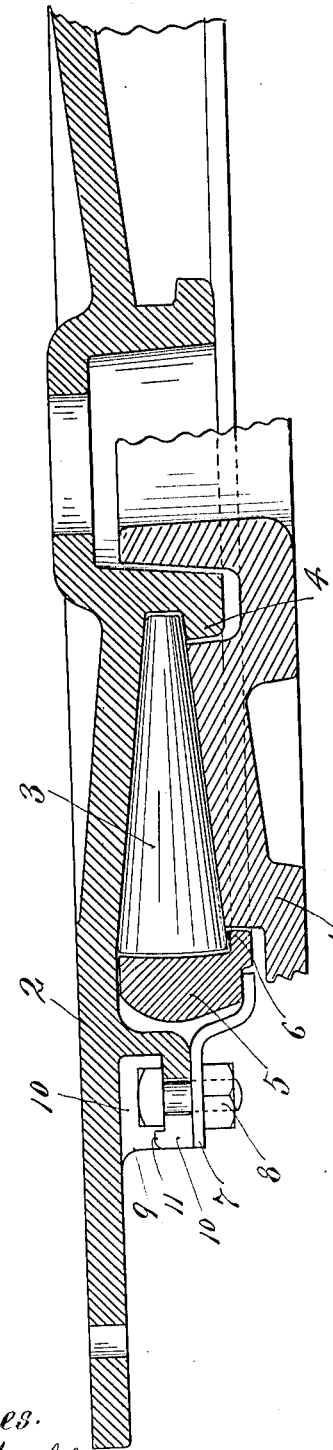

J. C. BARBER.
ROLLER CENTER BEARING FOR CARS.
APPLICATION FILED NOV. 1, 1912.

1,090,265.

Patented Mar. 17, 1914.
2 SHEETS—SHEET 1.

Witnesses.
A. H. Opsahl.
E. C. Skinkle

Inventor.
John C. Barber
By his Attorneys
Williamson & Merchant

J. C. BARBER.
ROLLER CENTER BEARING FOR CARS.
APPLICATION FILED NOV. 1, 1912.
1,090,265.
Patented Mar. 17, 1914.
2 SHEETS—SHEET 2.
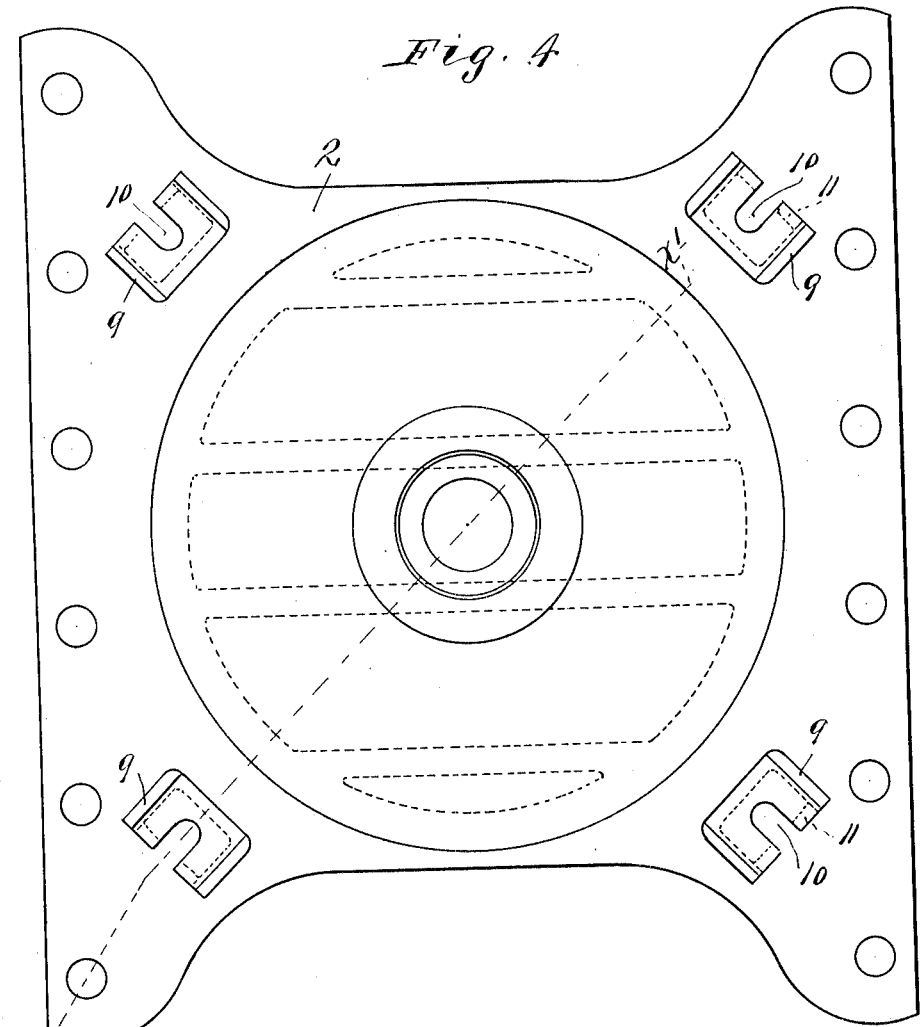
Fig. 4
Fig. 5
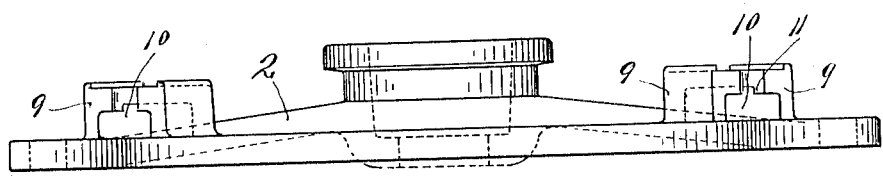
Witnesses
A. H. Opsahl.
E. C. Skinkle
Inventor
John C. Barber
By his Attorneys
Williamson & Merchant

UNITED STATES PATENT OFFICE.

JOHN C. BARBER, OF CHICAGO, ILLINOIS, ASSIGNOR TO STANDARD CAR TRUCK COMPANY, OF CHICAGO, ILLINOIS, A CORPORATION OF NEW JERSEY.

ROLLER CENTER-BEARING FOR CARS.

1,090,265.  Specification of Letters Patent. Patented Mar. 17, 1914.

Application filed November 1, 1912. Serial No. 729,036.

*To all whom it may concern:*

Be it known that I, JOHN C. BARBER, a citizen of the United States, residing at Chicago, in the county of Cook and State of Illinois, have invented certain new and useful Improvements in Roller Center-Bearings for Cars; and I do hereby declare the following to be a full, clear, and exact description of the invention, such as will enable others skilled in the art to which it appertains to make and use the same.

My present invention has for its object to improve the construction of roller center bearings, such as used in railway car construction, with a view of obtaining a minimum of friction as incident to the rotary and traveling movements of the bearing rollers, and, to such ends, generally stated, the invention consists of the novel devices and combinations of devices, hereinafter described and defined in the claims.

Particularly this invention relates to roller center bearings of the type wherein radially disposed conical rollers are interposed between conical bearing surfaces of coöperating bearing plates, and wherein outward movements of the rollers are resisted by a surrounding thrust flange or member, and wherein also the rollers, while free for rotary and traveling movements, are interlocked to one of the bearing members, as, for instance, my prior Patent 885,133 of date April 21st, 1908. In the said prior patent, the thrust flange against which the outer ends of the rollers press radially outward, was cast as a part of, or otherwise rigidly secured in respect to one of the bearing plates or members. In practice, it has been found that there is a slight shifting movement of the bearing plates in respect to each other, to and from positions in which their axes are coincident, and that this shifting movement will produce an excessive friction on the outer ends of the rollers, because the said thrust flange positively confines the rollers for traveling movements always concentric to the axis of the one bearing plate. I further found that this friction, due to the engagement of the outer ends of the rollers with the surrounding thrust flange or ring, can be reduced to a minimum by the use of a loose or so-called floating thrust ring which is interlocked to one of the bearing plates in such a manner that it can shift its position or gyrate slightly in respect to both bearing plates, in a plane at a right angle to the axis of the bearing. This feature I believe to be broadly new and desire to claim same broadly.

In the accompanying drawings, which show the preferred embodiment of my invention, in a center bearing of the type adapted for use in connection with cars, like characters indicate like parts throughout the several views.

Figure 2:
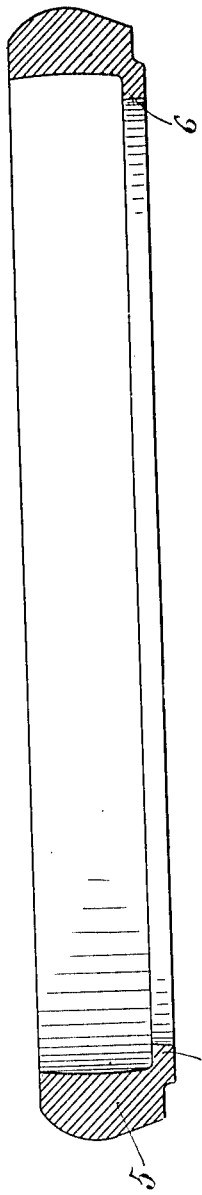
Figure 3:

Referring to the drawings, Figure 1 is a vertical section, taken through the improved center bearing, on the line $x^1 x^1$ on Fig. 4, some parts being broken away; Fig. 2 is a vertical section taken centrally through the floating thrust ring; Fig. 3 is a detail in plan showing one of the retaining clips for connecting the thrust ring to one of the bearing plates; Fig. 4 is a bottom plan view of the upper bearing plate; and Fig. 5 is a side elevation of the same.

The numeral 1 indicates the lower, and the numeral 2 the upper bearing plate, which bearing plates have telescoping hubs and coöperating conical roller bearing surfaces, between which latter the conical rollers 3 are interposed. The hub of the upper plate 2 is provided with a roller retaining flange 4 that underlies the small inner ends of the rollers.

The numeral 5 indicates the loose so-called floating thrust ring, against which the large outer ends of the rollers 3 engages, and by which the said rollers are prevented from moving radially outward. This thrust ring 5 has an inwardly extended and inner retaining flange 6 at its lower edge which underlaps the large outer ends of the rollers 3 and coöperates with the hub flange 4 to interlock the said rollers to the upper bearing plate with freedom for rotary movements, and for traveling movements. The ring 5 with its flange therefor affords a combined thrust ring and retaining ring. Of course, the horizontal shifting movements of the ring 5 will not be sufficient to permit the disengagement of the small inner ends of the rollers from the said hub flange 4.

The ring 5 is interlocked to one of the bearing plates, to-wit, as shown, to the upper bearing plate 2, by devices which permit the horizontal shifting or gyral movements of the said ring, above stated. The devices for accomplishing this connection between the said ring and upper bearing plate may take many forms, but preferably, I employ a plurality of retaining clips 7, rigidly but detachably secured by short nut-equipped bolts 8, to recessed lugs 9 cast on the plate 2 and having open or slotted bolt seats 10 and bolt retaining flanges 11. When the nuts on the bolts 8 are loosened, sufficiently to permit the bolt heads to clear the retaining flanges 11, the said bolts with the clips 7 may be moved radially outward from working positions and, of course, may be applied by reversing the operation. With this arrangement, broadly outlined above and specifically described in connection with the drawings, the rollers are held for traveling movements on the line of a circle that is always concentric to the axis of the thrust ring, but not necessarily truly or exactly concentric to the axis of either bearing plate; and, from this arrangement, it follows that the rollers can travel on a line of least resistance, which has the obvious effect of reducing the friction to a minimum. At the same time, the said rollers are interlocked to one of the bearing plates so that they will not fall from position in respect to the said bearing plate even when the bearing plates are separated. This latter feature is highly important because it facilitates assembling of the parts of the center bearing and prevents the rollers from being scattered when the bearing plates are separated. It, also, is important to note that the rollers are capable of traveling movements not only in respect to the upper and lower bearing plates, but also in respect to the thrust ring.

What I claim is:—

1. In a roller bearing, coöperating bearing plates, interposed radially disposed conical rollers and a thrust ring against which the outer ends of said rollers engage, said thrust ring being separable from one of said bearing plates but connected to the other with freedom for rotary movements and being removable therewith.

2. In a roller bearing, coöperating bearing plates, interposed radially disposed conical rollers, a thrust ring against which the outer ends of said rollers engage, and means connecting said thrust ring to one of said bearing plates with freedom for rotary movements, said thrust ring having a retaining flange lapping the ends of said rollers.

3. In a roller bearing, coöperating bearing plates, interposed conical rollers, a thrust ring against which the outer ends of said rollers engage, and means connecting said thrust ring to one of said bearing plates with freedom for movements in a plane at a right angle to the axis of the bearings, said thrust ring having a retaining flange lapping the outer ends of said rollers.

4. In a roller bearing, coöperating bearing plates, interposed conical rollers, a thrust ring against which the outer ends of said rollers engage, means connecting said thrust ring to one of said bearing plates with freedom for movements in a plane at a right angle to the axis of the bearings, said thrust ring having a retaining flange lapping the outer ends of said rollers, and the bearing plate to which said thrust ring is loosely connected having a hub with an annular retaining flange lapping the inner ends of said rollers.

5. A roller bearing, coöperating bearing plates interposed conical rollers, a thrust ring against which the outer ends of said rollers engage, means connecting said thrust ring to one of said bearing plates with freedom for rotary movements, said thrust ring having a retaining flange lapping the outer ends of said rollers, and the bearing plate to which said thrust ring is connected for rotation having a hub provided with an annular retaining flange lapping the inner ends of said rollers.

In testimony whereof I affix my signature in presence of two witnesses.

JOHN C. BARBER.

Witnesses:
LEE W. BARBER,
C. F. PHILLIPS.